Patented Sept. 28, 1948

2,449,996

UNITED STATES PATENT OFFICE 2,449,996

PREPARATION OF SULFUR CONTAINING DICARBOXYLIC ACIDS

Thomas L. Gresham and Forrest W. Shaver, Akron, Ohio, assignors to The B. F. Goodrich Company, New York, N. Y., a corporation of New York No Drawing. Application November 28, 1945, Serial No. 631,499

2 Claims. (Cl. 260—537)

This invention relates to the preparation of certain sulfur containing dicarboxylic acids and is particularly concerned with the preparation of such compounds by the reaction of mercapto carboxylic acids with beta-propiolactone.

In our copending application Ser. No. 620,660, filed October 5, 1945, we have disclosed that beta-propiolactone reacts at the mercapto group with mercaptans in which all hydrogen atoms except those attached to carbon are present in mercapto groups, to form beta-thio carboxylic acids. It is also disclosed in the copending application of Thomas L. Gresham and Jacob Eden Jansen, Ser. No. 620,658, filed October 5, 1945, that beta-propiolactone reacts with salts of carboxylic acids at the carboxylic acid group to produce beta-acyloxy carboxylic acid compounds.

By this invention we have discovered that when beta-propiolactone is reacted with a compound containing both a mercapto group and a carboxylic acid group, that is, a compound of the structure $$\text{HS—R—C—OH} \atop \|\atop O$$

wherein R is a divalent hydrocarbon radical, reaction occurs first at the mercapto group; and that accordingly when substantially equimolecular proportions of the reactants are employed, the product consists exclusively of a sulfur containing dicarboxylic acid of the formula

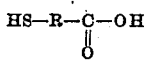

wherein R, as before and whenever appearing hereinafter, designates a divalent hydrocarbon radical.

The reaction between beta-propiolactone and a mercapto carboxylic acid requires no special conditions; it occurs whenever it is possible to bring the reactants into effective contact with one another. Thus, simply by mixing the reactants in any desired manner and heating the mixture in the absence of added materials, or by refluxing a solution of the reactants in an inert solvent such as benzene, ether, chloroform or the like, it is possible to obtain the desired dicarboxylic acid. Higher yields, however, are generally secured by carrying out the reaction in a polar solvent for the reactants such as water, alcohols or the like and, preferably, in the presence of an equimolar proportion of an inorganic base such as an alkali metal hydroxide or ammonium hydroxide. When the reaction is effected in this way it is preferable first to prepare an aqueous solution containing the mercapto carboxylic acid and the base, to add the lactone to this solution and then to acidify the solution whereupon the sulfur-containing dicarboxylic acid is generally liberated as an insoluble material.

Other conditions for the reaction such as temperature and pressure are not critical and may be varied widely. It is generally most convenient to operate at temperatures from 0 to 100° C. and at atmospheric pressure, but temperatures as low as —20° C. or lower or as high as 200° C. or higher and pressures considerably above or below atmospheric are also operable. When the reaction is effected in solution in a polar solvent, temperatures from 0 to 50° C. are particularly effective in producing highest yields of the dicarboxylic acid.

To illustrate the invention in more specific detail the following examples are cited, it being understood that the invention is by no means limited thereto. In the examples all parts are by weight.

Example 1

An aqueous solution is prepared by admixing 53 parts (0.5 mole) of thiohydracrylic acid

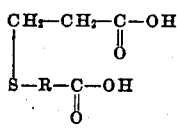

with 80 parts of an aqueous solution containing 20 parts (0.5 mole) of sodium hydroxide. To this solution there is then slowly added over a period of about an hour 36 parts (0.5 mole) of beta-propiolactone, the solution being stirred and cooled to a temperature of about 0 to 5° C. during the addition. After storing overnight at room temperature, the reaction solution is acidified with hydrochloric acid and is then extracted with ether. The ether extract is distilled under reduced pressure whereupon a fraction consisting of 40.9 parts of beta-thio dipropionic acid (also called bis-(2-carboxyethyl) sulfide) is obtained.

Example 2

53 parts of thiohydracrylic acid are dissolved in 35 parts of water and 36 parts of beta-propiolactone are then added thereto, the temperature of the solution during the addition being about 30–40° C. The reaction mixture is allowed to stand at room temperature for two days, whereupon a solid separates from the solution. The solid is filtered and recrystallized from a mixture of methanol and benzene. 12.2 parts of beta-thiodipropionic acid (M. P. 120° C.) are thus obtained.

Example 3

53 parts of thiohydracrylic acid are dissolved in 25 parts of methanol and 36 parts of beta-propiolactone are added. The solution is heated to 45° C. for about 2 hours and is then cooled. A solid separates which is filtered from the solution and recrystallized, thereby yielding 26 parts of beta-thiodipropionic acid. When methanol is replaced by ethanol in this example similar results are obtained.

Example 4

A mixture of 53 parts of thiohydracrylic acid and 36 parts of beta-propiolactone is dissolved in 100 parts of chloroform and the solution refluxed for about 2 hours. A part of the chloroform is then distilled and the solution cooled whereupon beta-thio dipropionic acid crystallizes from the solution in about 36% yield.

When any of the above examples, illustrating variations in reaction conditions and procedures, is repeated under the same conditions using other mercapto carboxylic acids of the formula

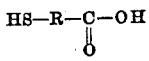

in place of thiohydracrylic acid, other sulfur containing dicarboxylic acids of the formula

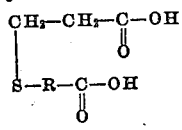

are secured in about the same yield. For example, when thioglycollic acid (mercapto-acetic acid) is used in place of thiohydracrylic acid, carboxymethyl beta-carboxy-ethyl sulfide is obtained. Other mercapto-carboxylic acids which may be substituted for thiohydracrylic acid include thiolactic acid, alpha-mercapto butyric acid, beta-mercapto-isobutyric acid, alpha-mercapto-lauric acid, thioricinoleic acid, thiosalicylic acid, o-mercapto-alpha-toluic acid, and the like. All these mercapto carboxylic acids possess the general formula

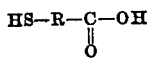

where R is a divalent hydrocarbon radical (which may be either aliphatic or aromatic, saturated or unsaturated in nature) and all produce when reacted with beta-propiolactone sulfur containing dicarboxylic acids having a structure the same as the mercapto-acid except that the hydrogen atom of the mercapto group is replaced by the beta-carboxy-ethyl

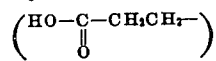

radical.

The sulfur containing dicarboxylic acids produced according to this invention are useful in the preparation of other organic compounds, for example, in the preparation of plasticizers, and are also useful in the rubber and plastics industries.

Numerous variations and modifications in the invention will be apparent to those skilled in the art and are within the spirit and scope of the appended claims.

We claim:

1. The method of preparing beta-thio dipropionic acid which comprises reacting thiohydracrylic acid and beta-propiolactone in aqueous solution in the presence of an alkali metal hydroxide, and then acidifying the solution.

2. The method of preparing a sulfur-containing aliphatic dicarboxylic acid of the formula

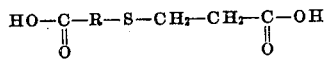

wherein R is a divalent aliphatic hydrocarbon radical containing from 1 to 17 carbon atoms which comprises reacting a mercapto-substituted aliphatic carboxylic acid of the formula

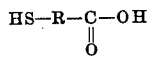

wherein R has the meaning set forth above with beta-propiolactone in aqueous solution in the presence of an alkali metal hydroxide, and then acidifying the solution.

THOMAS L. GRESHAM.
FORREST W. SHAVER.

REFERENCES CITED

The following references are of record in the file of this patent:

Chemische Zentralblatt 87 (1916), pp. 557, 558.